United States Patent [19]

Montgomery

[11] Patent Number: 4,571,877
[45] Date of Patent: Feb. 25, 1986

[54] FISHING LURE

[76] Inventor: Keneith R. Montgomery, 220 W. Daisy La., New Albany, Ind. 47150

[21] Appl. No.: 651,311

[22] Filed: Sep. 17, 1984

[51] Int. Cl.⁴ ............................................. A01K 85/00
[52] U.S. Cl. .................................... 43/42.11; 43/42.13
[58] Field of Search ............................ 43/42.11, 42.13

[56] References Cited

U.S. PATENT DOCUMENTS

| | | | |
|---|---|---|---|
| 1,734,883 | 11/1929 | Shannon | 43/42.13 |
| 2,471,499 | 5/1949 | Shipman | 43/42.13 |
| 3,110,979 | 11/1963 | Woodley | 43/42.13 |
| 3,253,363 | 5/1966 | Steehn | 43/42.13 |
| 3,546,804 | 12/1970 | Woolums | 43/42.11 |
| 3,747,256 | 7/1973 | Haddock | 43/42.13 |
| 3,808,726 | 5/1974 | Flanagan | 43/42.13 |
| 4,003,154 | 1/1977 | Carver | 43/42.13 |
| 4,011,681 | 3/1977 | Johnson | 43/42.11 |
| 4,209,932 | 7/1980 | Pate | 43/42.13 |

Primary Examiner—Nicholas P. Godici
Assistant Examiner—M. Jordan
Attorney, Agent, or Firm—Frank C. Leach, Jr.

[57] ABSTRACT

A fishing lure of the spinner bait type has a substantially rigid arm having a hook adjacent one end thereof with a lead weight on the substantially rigid arm adjacent its connection to the hook. The substantially rigid arm has a loop formed adjacent its other end to enable a fishing line to be attached thereto. One end of a non-rigid arm is connected to the other end of the substantially rigid arm with the arms diverging from each other and in the same vertical plane when the fishing lure is pulled through the water. The other end of the non-rigid arm has a spinner blade rotatably connected thereto. The non-rigid arm is movable relative to the substantially rigid arm to prevent rotation of the fishing lure when it is pulled through the water due to a torque produced by the spinner blade. The movement of the non-rigid arm is controlled by a sleeve surrounding it at its connection to the substantially rigid arm so that the forces on the arm are transferred from a single point to the entire circumference of the arm by the arm flexing or bending. Another form of the fishing lure has two non-rigid arms attached to the substantially rigid arm with each of the non-rigid arms having a spinner blade rotatably connected thereto. The two non-rigid arms extend in substantially opposite directions.

13 Claims, 3 Drawing Figures

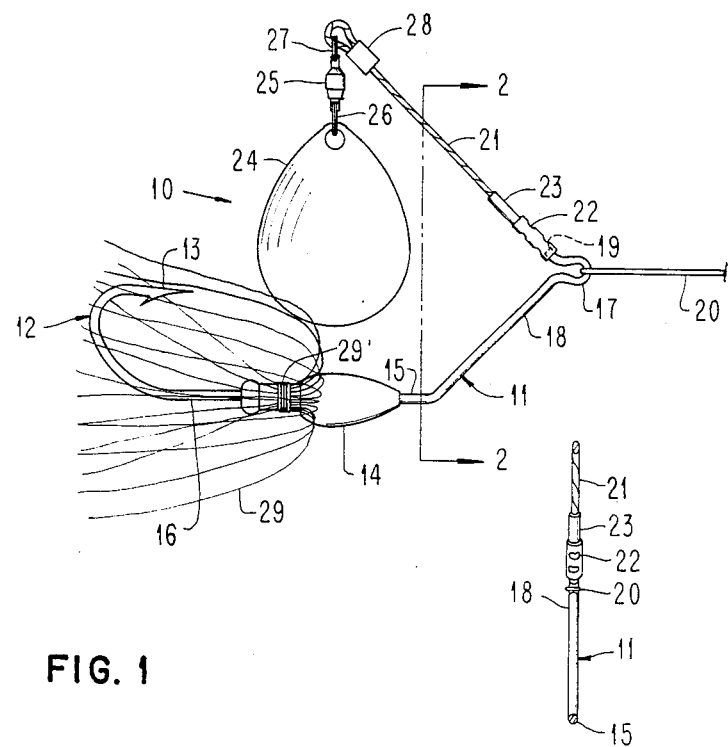
FIG. 1
FIG. 2
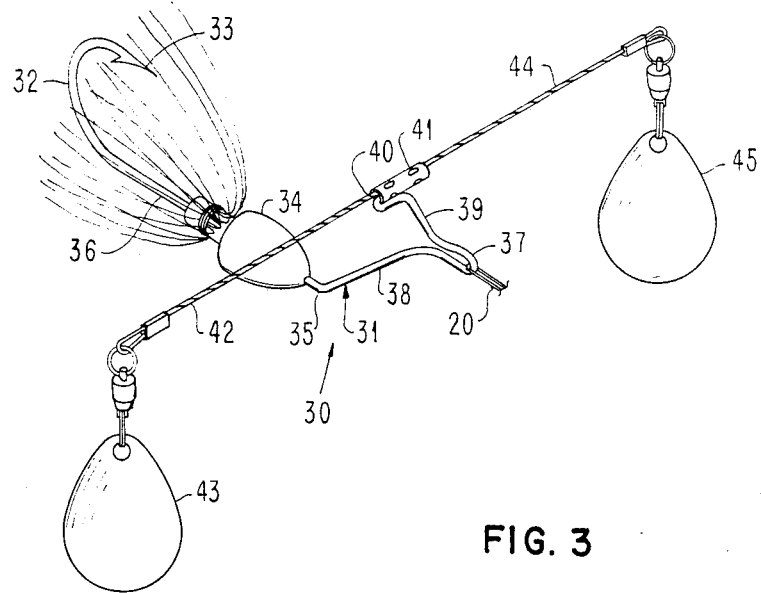
FIG. 3

FISHING LURE

This invention relates to a fishing lure and, more particularly, to a fishing lure of the spinner bait type.

Various fishing lures of the spinner bait type are disclosed in U.S. Pat. Nos. 1,734,883 to Shannon, 2,471,499 to Shipman, 3,110,979 to Woodley, 3,253,363 to Steehn, 3,747,256 to Haddock, 3,808,726 to Flanagan, Jr., 4,003,154 to Carver, and 4,209,932 to Pate. Except for the aforesaid Woodley patent, each of the aforesaid patents has its hook mounted adjacent an end of a first rigid arm and at least one additional rigid arm attached to the first rigid arm with at least one spinner blade rotatably connected at the free end of the additional rigid arm. The spinner blade rotates as the fishing lure is pulled through the water to attract a fish, particularly a bass, which has a relatively large mouth.

The rotating spinner blade attracts the fish because of the reflection of light therefrom along with noise created in the water by the rotation of the spinner blade. The fish strikes at the rotating blade so that the spinner blade must be close to the barb end of the hook for the fish to be caught.

The aforesaid Woodley patent has the hook and the spinner blade connected to each other by a bead chain, which is connected to a fishing line intermediate its ends. The fishing lure of the aforesaid Woodley patent relies upon the fishing lure being pulled through the water to have the hook disposed beneath the spinner blade and adjacent thereto whereas this is accomplished in each of the other of the aforesaid patents by a weight on the lower rigid arm having the hook at its end and the arms being rigid.

In the aforesaid Woodley patent, the dependence upon the spinner blade to be held above the hook by pulling through the water renders the fishing lure of no value when it is desired to let the fishing lure flutter. Flutter occurs when the fishing lure is allowed to fall towards the bottom without any pulling on the fishing lure through the fishing line. The bead chain of the fishing lure of the aforesaid Woodley patent will not seek balance when there is no pull on the fishing line so that the fishing lure of the aforesaid Woodley patent cannot be used when it is desired to have the fishing lure flutter; this is one of the means of fishing for bass so that the fishing lure of the aforesaid Woodley patent is not practical because it can only be used when pulling the fishing lure through the water.

The purpose of using the bead chain in the fishing lure of the aforesaid Woodley patent was to avoid the fish hitting the rigid arm forwardly of the hook and brushing the hook aside. However, the fishing lure of the aforesaid Woodley patent is not capable of being used when it is desired to have the fishing lure flutter.

With each of the aforesaid patents except for the aforesaid Woodley patent, the rigid arms enable the fishing lure to flutter and remain with the hook at the bottom of the body of water without any pull on the fishing line.

In flutter, even though there is no pull on the fishing line, the falling of the fishing lure through the water causes rotation of the blade. This is because of the water passing around the spinner blade as the spinner blade falls downwardly.

During flutter, the spinner blade or blades should remain substantially vertical because of the vertical motion through the water. As a result, the fishing lure tends to be positioned so that the spinner blade is substantially forward of the barb end of the hook rather than adjacent thereto as when the fishing lure is pulled through the water. Therefore, the fishing lures of the aforesaid patents except for the aforesaid Woodley patent have the disadvantage of a fish striking at the spinner blade during flutter and completely missing the hook because of the spinner blade being substantially forward of the barb end of the hook.

When the arms of the fishing lure are rigid, the fishing lure has several other disadvantages. One is that pulling a fishing lure too fast through the water causes a more rapid rotation of the spinner blade; this increases the torque on the fishing lure to cause the fishing lure to turn. The torque created by the rotation of the spinner blade is transmitted to the rigid arm having the hook, particularly when the rigid arms are unitary.

This turning of the fishing lure changes the relation of the spinner blade to the hook and also alters the position of the hook in the water. As a result, the fishing lure may be more easily caught on underwater objects such as weeds, brush, and the like. This also results in the fish not being caught when it strikes at the spinner blade with the hook above the spinner blade, for example, as occurs during turning of the fishing lure.

Because a bass hides beneath underwater objects, it is necessary to pull the fishing lure along the bottom of the body of water over underwater objects to attract the bass after the fishing lure has been allowed to flutter to the bottom. When the fishing lure engages an underwater object, the fishing lure tends to turn and the rigid arm, which has the spinner blade rotatably connected to its free end, causes the fishing lure to continue to turn because of the torque produced by rotation of the spinner blade due to pulling of the fishing lure along the bottom of the body of water.

When the hook on the one rigid arm is above the spinner blade on the other rigid arm, fishing lures of the aforesaid patents except for the Woodley patent easily catch on underwater objects. When this occurs, it is necessary to cut the line if one is fishing from a bank or to go with a boat, if one is fishing from a boat, to remove the fishing lure from the object on which it is hung.

The fishing lure of the present invention satisfactorily solves the foregoing problems through using a non-rigid arm, which is flexible and bends, for the arm to which the spinner blade is rotatably connected. The arm, which has the hook and weight connected thereto, is still rigid to insure that the fishing lure will balance when it flutters.

The flexibility of the non-rigid upper arm of the fishing lure of the present invention also prevents turning of the fishing lure due to torque created on the non-rigid upper arm by pulling the fishing lure too fast through the water. The flexibility of the non-rigid upper arm absorbs the torque produced by the spinner blade rather than allowing it to be absorbed by the weight, which tends to cause the fishing lures of the aforesaid patents except for the aforesaid Woodley patent to turn when the fishing lure is pulled too fast through the water, adjacent the hook.

Likewise, if the fishing lure catches on an underwater object, the non-rigid upper arm of the fishing lure of the present invention has sufficient flexibility that the fishing lure cannot continue to turn if it is started to be turned by an underwater object. Therefore, the pulling of the fishing lure of the present invention over an underwater object, which a bass hides behind, is accomplished without turning of the fishing lure or the fishing lure being caught on an underwater object.

While the aforesaid Woodley patent discussed the problem of the hook being moved away from the mouth of the fish because of the hook being on a rigid arm, the upper arm, which has the spinner blade, also can cause the hook to be knocked out of the mouth of the fish when the fish goes after the fishing lure if the upper arm is rigid. This problem is avoided with the fishing lure of the present invention since the non-rigid upper arm is sufficiently flexible to move out of the way when the hook is grabbed by the fish. This includes the fish hitting the hook from the side as well as from the rear.

Because of the flexibility of the non-rigid upper arm of the fishing lure of the present invention, the barb end of the hook can penetrate deeper into the mouth of the fish to obtain a more firm attachment within the fish. This is because the non-rigid upper arm bends, due to its flexibility, as the hook at the end of the rigid lower arm moves into the mouth of the fish.

A fisherman sometimes desires to use a larger spinner blade. The use of a larger spinner blade increases the torque on the fishing lure when both of the arms are rigid because the increased size of the spinner blade produces more turning for the same pulling speed through the water. Therefore, the use of a larger spinner blade cannot be employed with a fishing lure of the spinner bait type having rigid upper and lower arms without creating an undersired torque. However, the non-rigid upper arm of the fishing lure of the present invention is capable of having different size spinner blades rotatably connected thereto since the flexibility of the non-rigid upper arm takes the torque off the fishing lure and allows the fishing lure to seek its own balance whereby the weight on the rigid lower arm moves the hook beneath the non-rigid upper arm.

The non-rigid upper arm also can use a bigger spinner blade than a rigid arm of the same diameter. This is due to the non-rigid arm having sufficient flexibility to absorb the torque created on the fishing lure.

With the fishing lure of each of the aforesaid patents except for the aforesaid Woodley patent, any accidental bending of the rigid upper arm, which can occur when the fishing lure is momentarily caught on an underwater object and pulled loose by force on the fishing line, for example, automatically causes torque on the fishing lure during any pulling of the fishing lure through the water. This is because bending of the upper rigid arm results in the spinner blade not being aligned, i.e., not in the same vertical plane, with the arm having the hook. This problem is avoided by the fishing lure of the present invention since the upper arm is non-rigid and flexes rather than having a permanent bend produced therein when momentarily catching on an underwater object, for example.

While extending the length of the upper rigid arm so that the spinner blade would be rearward of the hook would prevent the grabbing of an underwater object through keeping the hook in the same vertical plane with the upper rigid arm, the longer rigid arm would prevent hooking of a fish approaching from the side of the fishing lure. Since the spinner blade reflects light during its spinning and attracts the fish, the fish may strike at the spinner blade. If it does with the longer rigid upper arm, the fish would not grab the hook.

Thus, it is desirable to have the spinner blade close to the hook. The fishing lure of the present invention accomplishes this without having the fishing lure rotate when it strikes an underwater object while still allowing the fishing lure to fall through the water without pulling on the fishing line when desired.

An object of this invention is to provide a unique fishing lure of the spinner bait type.

Another object of this invention is to provide a fishing lure of the spinner bait type that does not rotate when subjected to torque.

Other objects of this invention will be readily perceived from the following description, claims, and drawing.

This invention relates to a fishing lure including a substantially rigid arm having a hook adjacent one end thereof and weight means adjacent the hook with the substantially rigid arm having attachment means for attachment to a fishing line adjacent its other end. At least one non-rigid arm is connected by connecting means to the substantially rigid arm adjacent the other end of the substantially rigid arm and beyond the attachment means. The non-rigid arm has spinner means rotatably connected thereto for rotation relative to the non-rigid arm with the spinner means being rotatably connected to the non-rigid arm remote from the connection of the non-rigid arm to the substantially rigid arm. The non-rigid arm is movable relative to the substantially rigid arm when subjected to a torque.

The attached drawing illustrates preferred embodiments of the invention, in which:

FIG. 1 is a side elevational view of one form of the fishing lure of the present invention;

FIG. 2 is a fragmentary sectional view of a portion of the fishing lure of FIG. 1 and taken along line 2—2 of FIG. 1; and FIG. 3 is a perspective view of another form of the fishing lure of the present invention.

Referring to the drawing and particularly FIG. 1, there is shown a fishing lure 10 of the spinner bait type. The fishing lure 10 includes a substantially rigid lower arm 11. One suitable example of the substantially rigid arm 11 is a stainless steel tempered wire having a diameter of 0.045". Any other substantially rigid or stiff wire may be used as the substantially rigid lower arm 11.

One end of the substantially rigid lower arm 11 has a hook 12, which has a barb 13 at its free end, connected thereto by suitable means such as an eye connector (not shown). Then, a lead weight 14 is molded around the eye connector, a portion 15 of the substantially rigid lower arm 11, and a shank 16 of the hook 12 to form a unitary hook assembly.

After the lead weight 14 has been formed, the substantially rigid lower arm 11 is placed in a jig and bent to form a loop 17 adjacent the other end of the rigid arm 11. The loop 17 is formed between portions 18 and 19, which are substantially perpendicular, of the substantially rigid lower arm 11. The loop 17 enables a fishing line 20 to be attached to the rigid arm 11 to enable pulling of the fishing lure 10 through the water and casting of the fishing lure 10.

A non-rigid upper arm 21 is formed of a suitable flexible wire and disposed in the same vertical plane (plane of FIG. 1 as shown in FIG. 2) as the substantially rigid lower arm 11 and from which it diverges. One example of the wire forming the non-rigid upper arm 21 is a flexible wire sold by Berkley Stainless Steel as ninety pound 49 wire. This wire contains twenty-one strands stranded for strength with a diameter of 0.025". Any other suitable flexible wire having sufficient strength may be employed as the non-rigid upper arm 21.

The non-rigid upper arm 21 has one end connected to the portion 19, which is flattened, of the lower substantially rigid arm 11. The non-rigid-upper arm 21 is connected to the substantially rigid lower arm 11 through a sleeve 22, which is crimped to hold the arms 11 and 21 to each other. One suitable example of the sleeve 22 is sold by Rosco, a Division of Rome Specialty Company, Inc., Rome, N.Y. as a No. 6 sleeve having an inside diameter of 0.071", an outside diameter of 0.105", and a length of 0.375".

Prior to connecting the non-rigid upper arm 21 to the substantially rigid lower arm 11, a shrink tube 23, which is made of a resilient material such as rubber, for example, is disposed over a portion of the non-rigid upper arm 21 so that bending of the non-rigid upper arm 21 relative to its connection by the sleeve 22 to the substantially rigid lower arm 11 does not apply the force at one point of the arm 21 so as to cause wear thereof. Instead, the force is distributed around the circumference of the arm 21 even though bending is occurring at only one point on the arm 21. The shrink tube 23 has a diameter of 1/16", for example.

The shrink tube 23 is not necessary for satisfactory operation of the fishing lure 10 of the present invention. However, because of the substantial forces to which the non-rigid upper arm 21 of the fishing lure 10 is subjected when casting, the shrink tube 23 is desirable because it increases the life of the fishing lure 10 since it distributes the force applied to the non-rigid upper arm 21 so that it will not fray at one point.

The other end of the non-rigid upper arm 21 has a spinner blade 24 rotatably connected thereto. The spinner blade 24, which is formed with a cup so as to be turned by the water during movement therethrough, is connected through a swivel 25 to the non-rigid upper arm 21 so that the spinner blade 24 may rotate relative to the non-rigid upper arm 21. One end of the swivel 25 has a ring 26 connecting it to the spinner blade 24, and the other end of the swivel 25 has a ring 27 connecting it to the non-rigid upper arm 21.

The non-rigid upper arm 21 has its free end pass through the ring 27 and is then bent back on itself. A sleeve 28 then joins the free end of the non-rigid upper arm 21 to another portion of the non-rigid upper arm 21 through crimping the sleeve 28.

One suitable example of the swivel 25 is a ball bearing swivel sold as No. 2 swivel by Sampo, a Division of Rome Specialty Company, Inc., Rome, N.Y. Any other suitable swivel which will allow the spinner blade 24 to rotate freely relative to the non-rigid upper arm 21 may be employed.

The length of the non-rigid upper arm 21 is such that the spinner blade 24 rides above and forward of the barb 13 of the hook 12 when the fishing lure 10 is at rest. Therefore, when pulling the fishing lure 10 through the water by pulling on the fishing line 20, the spinner blade 24 will be disposed adjacent the barb 13 of the hook 12 so as to attract the fish to the barb 13 of the hook 12.

A skirt 29 is attached to the lead weight 14. The skirt 29 is tied to the lead weight 14 by a thread 29'. The skirt 29 preferably is formed from a rectangular shaped piece of rubber having a plurality of parallel score lines. After the skirt 29 is attached to the lead weight 14, the rectangular shaped part is separated along the score lines to form the skirt 29.

Referring to FIG. 3, there is shown a fishing lure 30. The fishing lure 30 includes a substantially rigid lower arm 31 having a hook 32, which has a barb 33 at its free end, connected at one end by an eye connector (not shown) with a lead weight 34 molded around the eye connector, a portion 35 of the substantially rigid lower arm 31, and a shank 36 of the hook 32 to form a unitary hook assembly.

After the lead weight 34 has been formed, the substantially rigid lower arm 31 is placed in a jig and bent to form a loop 37 adjacent its other end. The loop 37 is formed between substantially perpendicular portions 38 and 39 of the substantially rigid arm 31. The loop 37 enables the fishing line 20 to be attached to the rigid arm 31 to enable pulling of the fishing lure 30 through the water and casting of the fishing lure 30.

The substantially rigid lower arm 31 has its end 40 formed substantially perpendicular to the remainder of the substantially rigid lower arm 31 for disposition within one end of a sleeve 41, which is the same as the sleeve 22 (see FIG. 1). The inside diameter of the sleeve 41 (see FIG. 3) is sufficient to receive one end of a substantially non-rigid arm 42, which may be made of the same material as the non-rigid arm 21 (see FIG. 1).

The sleeve 41 (see FIG. 3) is crimped to connect the non-rigid arm 42 to the substantially rigid arm 31. The free end of the non-rigid arm 42 has a spinner blade 43 rotatably connected thereto in the same manner as the spinner blade 24 (see FIG. 1) is connected to the non-rigid arm 21 of the fishing lure 10.

A second non-rigid arm 44 (see FIG. 3) is disposed in the opposite end of the sleeve 41 from the non-rigid arm 42 and retained therein by crimping the sleeve 41. This results in the non-rigid arms 42 and 44 extending away from each other in substantially opposite directions. The second non-rigid arm 44 has a spinner blade 45 rotatably mounted on its free end in the same manner as the spinner blade 24 (see FIG. 1) is rotatably mounted on the non-rigid arm 21 of the fishing lure 10.

The spinner blades 43 (see FIG. 3) and 45 are relatively small in comparison with the size of the spinner blade 24 (see FIG. 1). This is because the fishing lure 30 (see FIG. 3) is employed for bottom fishing in which it is desired to get to the bottom as fast as possible so that the spinner blades 43 and 45 are smaller to prevent the spinner blades 43 and 45, which are turning due to movement through the water, from retarding the fall of the fishing lure 30 at a desired rate. Because of the relatively light weight of each of the spinner blades 43 and 45, the shrink tube 23 (see FIG. 1) is not required to prevent wear of the non-rigid arms 42 and 44.

An advantage of this invention is that different size spinner blades may be used for the same size wire forming a non-rigid arm on which the spinner blade is rotatably mounted. Another advantage of this invention is that a fishing lure of the spinner bait type is prevented from catching on underwater objects when pulled through the water. A further advantage of this invention is that rotation of the fishing lure of the spinner bait type is prevented when it is pulled rapidly through the water. Still another advantage of this invention is that it allows a barb of a hook of a fishing lure of a spinner bait type to penetrate deeper into the mouth of a fish.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

I claim:

1. A fishing lure including:
   a substantially rigid arm having a hook adjacent one end thereof and weight means adjacent said hook;
   said substantially rigid arm having attachment means for attachment to a fishing line adjacent its other end;
   at least one substantially straight non-rigid arm separate from said rigid arm;
   connecting means to connect one end of said non-rigid arm to said substantially rigid arm adjacent the other end of said substantially rigid arm and beyond said attachment means;
   said non-rigid arm having spinner means rotatably connected thereto for rotation relative to said non-rigid arm, said spinner means being rotatably connected to said non-rigid arm remote from the connection of said non-rigid arm to said substantially rigid arm;
   and said non-rigid arm being flexibly movable relative to said substantially rigid arm when said lure is subjected to a torque.

2. The fishing lure according to claim 1 including:
   only one of said non-rigid arms;
   and said non-rigid arm and said substantially rigid arm being disposed in the same plane and diverging from each other.

3. The fishing lure according to claim 2 including limit means for limiting the relative movement of said non-rigid arm with respect to said substantially rigid arm.

4. The fishing lure according to claim 3 in which:
   said hook includes a barb at its free end;
   and said substantially non-rigid arm has said spinner means rotatably connected to its end remote from said connecting means.

5. The fishing lure according to claim 3 in which:
   said substantially rigid arm includes:
   a first portion on one side of said attachment means and having said connecting means connected thereto;
   and a second portion extending on the opposite side of said attachment means from said first portion and disposed substantially perpendicular to said first portion, said second portion having a length substantially greater than said first portion;
   and said substantially non-rigid arm forms a substantial continuation of said first portion of said substantially rigid arm.

6. The fishing lure according to claim 2 in which:
   said hook includes a barb at its free end;
   and said substantially non-rigid arm has said spinner means rotatably connected to its end remote from said connecting means.

7. The fishing lure according to claim 2 in which:
   said substantially rigid arm includes:
   a first portion on one side of said attachment means and having said connecting means connected thereto;
   and a second portion extending on the opposite side of said attachment means from said first portion and disposed substantially perpendicular to said first portion, said second portion having a length substantially greater than said first portion;
   and said substantially non-rigid arm forms a substantial continuation of said first portion of said substantially rigid arm.

8. The fishing lure according to claim 1 including only one of said non-rigid arms.

9. The fishing lure according to claim 8 including limit means for limiting the relative movement of said non-rigid arm with respect to said substantially rigid arm.

10. The fishing lure according to claim 9 in which said limit means comprises hollow cylindrical means.

11. The fishing lure according to claim 9 in which:
    said hook includes a barb at its free end;
    and said substantially non-rigid arm has said spinner means rotatably connected to its end remote from said connecting means.

12. The fishing lure according to claim 9 in which:
    said substantially rigid arm includes:
    a first portion on one side of said attachment means and having said connecting means connected thereto;
    and a second portion extending on the opposite side of said attachment means from said first portion and disposed substantially perpendicular to said first portion, said second portion having a length substantially greater than said first portion;
    and said substantially non-rigid arm forms a substantial continuation of said first portion of said substantially rigid arm.

13. The fishing lure according to claim 1 including:
    two of said non-rigid arms;
    said connecting means including means to connect one end of each of said two non-rigid arms to said substantially rigid arm adjacent the other end of said substantially rigid arm and beyond said attachment means;
    and said two non-rigid arms extending in substantially opposite directions.

* * * * *